Figure 4:
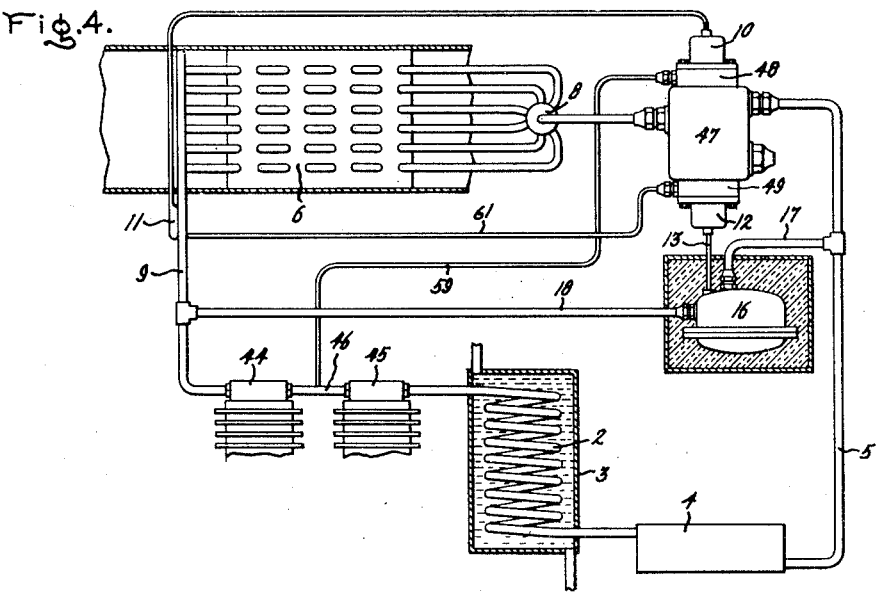

Feb. 14, 1950    H. F. LATHROP    2,497,677
REFRIGERATING SYSTEM INCLUDING FLOW CONTROL DEVICES
Filed April 26, 1944    3 Sheets-Sheet 1
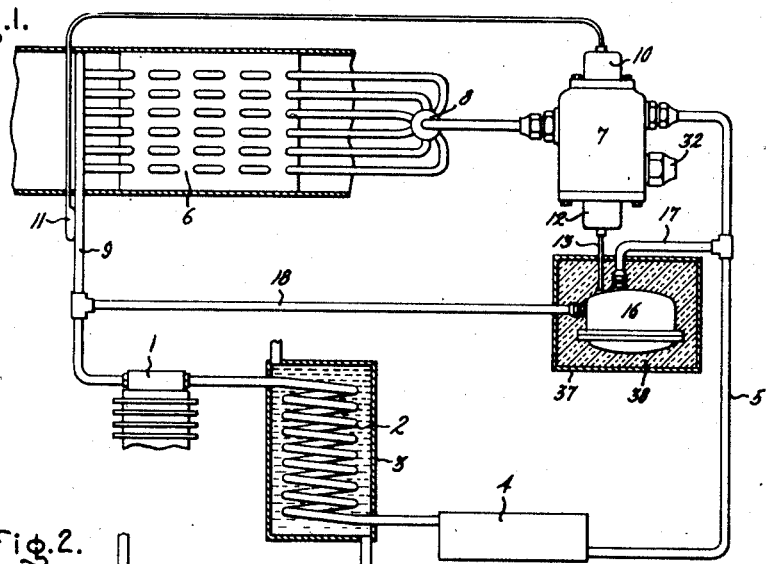
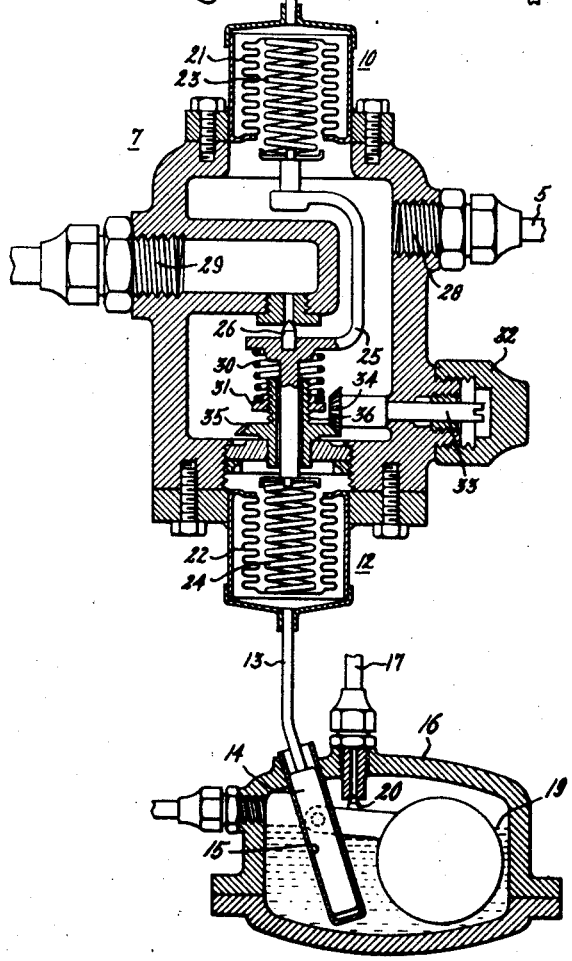
Inventor:
Harold F. Lathrop,
by Harry E. Dunham
His Attorney.

Feb. 14, 1950 H. F. LATHROP 2,497,677
REFRIGERATING SYSTEM INCLUDING FLOW CONTROL DEVICES
Filed April 26, 1944 3 Sheets-Sheet 2

Inventor:
Harold F. Lathrop,
by Harry E. Dunham
His Attorney.

Feb. 14, 1950     H. F. LATHROP     2,497,677
REFRIGERATING SYSTEM INCLUDING FLOW CONTROL DEVICES
Filed April 26, 1944     3 Sheets-Sheet 3
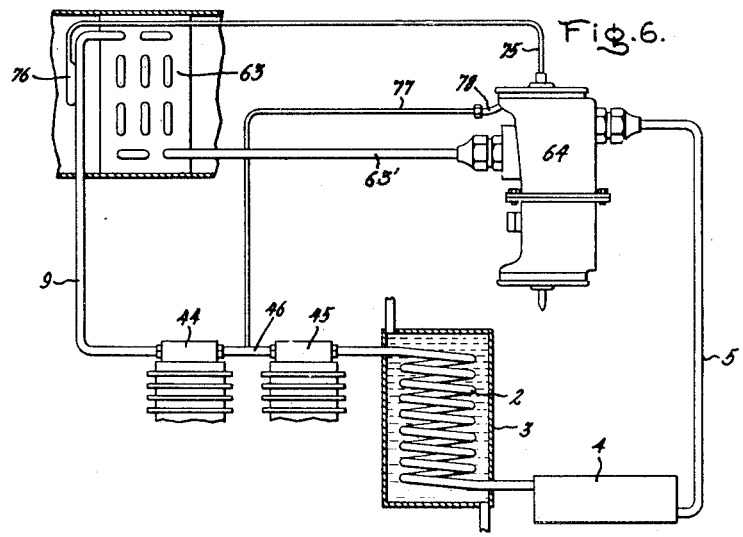
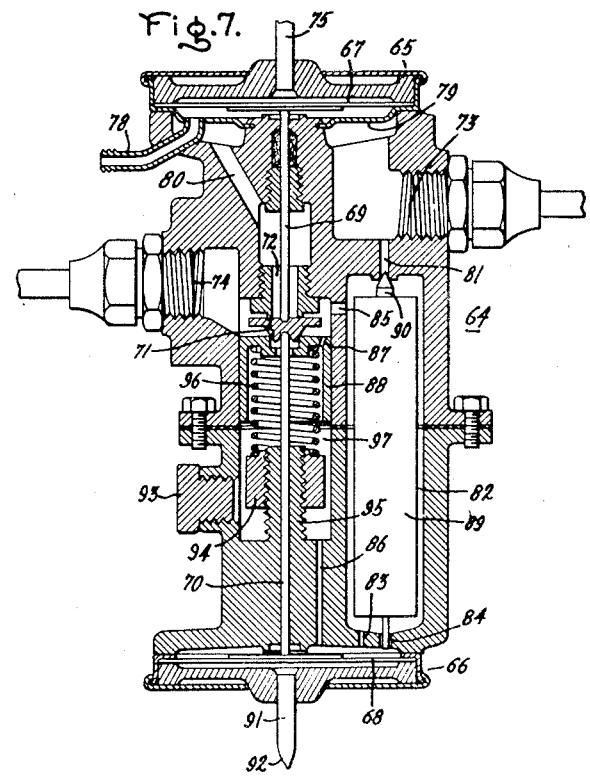
Inventor:
Harold F. Lathrop,
by Harry E. Dunham
His Attorney.

Patented Feb. 14, 1950

2,497,677

UNITED STATES PATENT OFFICE 2,497,677

REFRIGERATING SYSTEM, INCLUDING FLOW CONTROL DEVICES

Harold F. Lathrop, Grabill, Ind., assignor to General Electric Company, a corporation of New York Application April 26, 1944, Serial No. 532,772

15 Claims. (Cl. 62—8)

My invention relates to refrigerating systems and particularly to refrigerant flow control devices for facilitating the operation of such systems at very low temperatures.

Refrigerating systems employed in air conditioning cold storage and other air cooling installations are commonly equipped with thermostatic expansion valve for controlling the flow of refrigerant to the evaporator. The conventional thermostatic expansion valve is arranged to maintain a substantially constant amount of superheat in the vaporized refrigerant withdrawn from the evaporator. The amount of superheat is measured as the difference between the temperature of the vaporized refrigerant withdrawn from the evaporator and the saturation temperature of the liquid refrigerant in the evaporator. In order to control superheat the thermostatic expansion valve is provided with one control member actuated in accordance with the pressure of the refrigerant in the evaporator and another control member actuated in accordance with the temperature of the vaporized refrigerant withdrawn from the evaporator. The resultant force of the two actuating members is balanced by a suitable device such as an adjustable spring which determines the amount of superheat that the valve will maintain. During the operation of the valve, the pressure actuating member tends to close the valve on a rise in evaporator pressure and the temperature actuated member tends to open the valve on a rise in temperature of the withdrawn refrigerant.

The conventional thermostatic expansion valve is provided with a temperature responsive actuating member comprising an expansion bellows connected by a small diameter tube or capillary to a feeler bulb located so as to be responsive to the temperature of the withdrawn vaporized refrigerant. This actuating member is normally partially filled with a vaporizable liquid which may be the same refrigerant as employed in the refrigerating system although other liquids and gases are used when different pressure-temperature characteristics are desired. A thermostatic expansion valve arranged to maintain the desired number of degrees of superheat when the operating temperature of the evaporator is around zero degrees Fahrenheit will not satisfactorily maintain the same number of degrees of superheat at very low temperatures, say in the neighborhood of —80° F.

At the low temperatures the common refrigerants such as Freon-12, Freon-22, and ammonia, operate with a relatively high vacuum in the evaporator. With these low pressures, the ratio of change in pressure per degree change in temperature becomes very small, compared with the value of this ratio at air conditioning temperatures, for example. This means that conventional thermostatic expansion valves, which work on a change in pressure proportionate to a change in superheat at the feeler bulb, become sluggish and insensitive at low temperatures. It is necessary to resort to oversize valves and various other expedients to improve the operation. Accordingly, it is one object of my invention to provide an improved thermostatic expansion valve which shall be sensitive to small changes in superheat in refrigerating systems operated at very low temperatures.

It is another object of my invention to provide in a refrigerating system a thermostatic expansion valve of simple and rugged construction and which shall facilitate the operation of the system at very low temperatures and effectively maintain a desired amount of superheat in the vaporized refrigerant withdrawn from the evaporator of the system.

It is another object of my invention to provide a thermostatic expansion valve for refrigerating systems actuated solely in response to temperature changes in the system and which shall be operable to admit liquid refrigerant to the evaporator at the beginning of the refrigerating cycle whether or not liquid refrigerant is present in the evaporator at the start of operation.

Further objects and advantages of my invention will become apparent as the following description proceeds, and the features of novelty which characterize my invention will be pointed out with particularity in the claims annexed to and forming a part of this specification.

Figure 5:
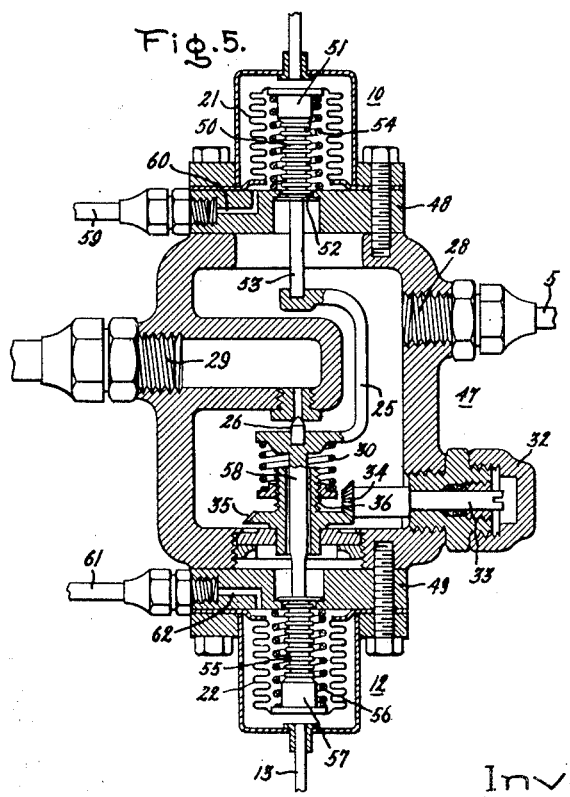

For a better understanding of my invention reference may be had to the accompanying drawings in which Fig. 1 is a diagrammatic illustration of a refrigerating system embodying my invention; Fig. 2 is an enlarged sectional view of the expansion valve and control shown in Fig. 1; Fig. 3 is a diagrammatic view of a portion of a refrigerating system similar to that shown in Fig. 1 illustrating a modified form of my invention; Fig. 4 is a diagrammatic view of a refrigerating system employing a multi-stage compressor and embodying my invention; Fig. 5 is an enlarged sectional view of the expansion valve shown in Fig. 4; Fig. 6 is a diagrammatic view of another embodiment of my invention; and Fig. 7 is an enlarged sectional view of the valve shown in Fig. 6.

Briefly, the refrigerating systems illustrated in the drawings are of the compression type and are provided with thermostatic expansion valves for controlling the amount of superheat in the vaporized refrigerant withdrawn from the evaporators. In each system shown the valve is actuated by one device responsive to the temperature of the vaporized refrigerant and an opposed device responsive to the saturation temperature of the liquid refrigerant. This latter device takes the place of the pressure actuated member of the conventional valve and tends to close the valve on a rise in temperature of the liquid in the evaporator. When temperatures throughout the system have risen as when the system is not in operation, the valve is held closed by the saturation temperature responsive device. In order to open the valve it is necessary to cool the feeler element of this device and an arrangement is provided for supplying liquid refrigerant at the pressure prevailing in the evaporator for cooling the feeler element and insuring opening of the valve to admit refrigerant to the evaporator. The liquid refrigerant for this purpose may be by-passed around the valve. Another feature which facilitates a wide range of superheat control at very low temperatures which may be provided particularly in multi-stage compressor systems, comprises an arrangement for using the difference in pressure between the interstage and suction connections of the multi-stage system for modifying the operation of the temperature responsive elements. In order to insure the desired characteristics which may be obtained through employment of a second temperature responsive device instead of the usual pressure responsive device in a thermostatic expansion valve, both expansible chamber devices are charged with a gas, such as ethane, which has a higher vapor pressure than that of the refrigerant circulating in the system and provides greater effective response to a change in temperature than can be obtained with the usual combination of pressure and temperature responsive elements.

In order to utilize a high pressure gas such as ethane in the temperature responsive elements it may be found preferable to charge the elements to a predetermined maximum pressure, such that the gas is non-condensible under shut-down conditions, when the valve is exposed to ambient temperatures.

Referring now to Fig. 1, the refrigerating system comprises a compressor 1 arranged to supply hot compressed refrigerant to a condenser 2 which is cooled by water flowing through a jacket 3 surrounding the condenser. The refrigerant is cooled and liquefied in the condenser and flows to a liquid receiver 4 from which it flows through a liquid line 5 to an evaporator 6 under control of a thermostatic expansion valve 7. The evaporator 6 comprises a plurality of conduits connected in parallel flow relationship between the valve and the outlet of the evaporator. Refrigerant flowing from the valve 7 is divided equally among the several conduits by a suitable distributor 8 and refrigerant vaporized in the several conduits of the evaporator 6 flows to a common suction line 9 and is returned to the compressor in the usual way. The system is intended for operation at very low temperatures and the expansion valve 7 is constructed in a way to facilitate this operation.

The details of construction of the expansion valve 7 are clearly shown in Fig. 2. The valve is provided with a temperature responsive device 10 having a thermal element or bulb 11 secured to the suction line 9 to be responsive to the temperature of the vaporized refrigerant in the suction line. The valve 7 also includes a temperature responsive device 12 connected through a capillary tube 13 to a feeler bulb 14 which is responsive to the saturation temperature of the liquid refrigerant in the evaporator. The bulb 14 is arranged in a recess 15 within a chamber 16 containing liquid refrigerant supplied from the liquid line 5 through a connection 17 and maintained at the pressure in the evaporator by communication with the suction line through a connection 18. The liquid refrigerant in the chamber 16 is kept at a desired level indicated at 19, by operation of a float controlled valve 20. The connection 18 communicates with the suction line near the feeler bulb 11 so that the liquid refrigerant in the chamber 16 is at a pressure and temperature substantially the same as the saturation temperature or boiling point of the liquid refrigerant in the evaporator. Actually, the pressure in the suction line is slightly lower than that throughout the evaporator and the pressure in chamber 16 is, therefore, independent of pressure drop in the evaporator. The temperature responsive devices 10 and 12 include expansible chambers or bellows 21 and 22, respectively, which are coupled in opposed relation through springs 23 and 24, respectively, and a yoke 25; a valve 26 is connected to be actuated by the yoke for controlling the passage of refrigerant from the inlet of the valve body 7, indicated at 28, to the outlet of the valve body, indicated at 29.

When the pressures in the elements 10 and 12 are equal, the valve is closed by a calibrating spring 30 arranged between the yoke 25 and an adjustable stationary collar 31; the spring 30 serves to bias the valve toward its closed position. The force of the spring 30 may be adjusted by removing a cap 32 from the valve body and turning a shaft 33; this adjusts the position of the collar 31 by rotating meshed bevel gears 34 and 35, the collar 31 being adjustably mounted on a threaded sleeve 36 forming an extension of the gear 35.

It will be evident that the increase of pressure in the expansible chamber 21 tends to open the valve 26 against the pressure of the spring 30 while an increase in pressure in the chamber 22 tends to close the valve. The two devices thus act in opposed relation, and the amount of pressure required to open the valve depends upon the difference of pressure between the two expansible chamber devices and the force of the spring 30. The difference in temperature between the feeler bulbs 11 and 14 is dependent upon the amount of superheat in the refrigerant withdrawn from the evaporator and the operation of the valve tends to maintain the superheat at a substantially constant value as determined by the setting of the spring 30.

The conventional thermostatic expansion valve becomes less sensitive as the system is operated at lower temperatures or temperatures below the normal range of operation of the valve. The loss of sensitivity is due primarily to the decrease in pressure change available for actuating the expansion valve for a given number of degrees of change in the superheat temperature. As has been pointed out above, the expansible chambers 10 and 12 are both actuated in accordance with temperature changes. This avoids the loss of sensitivity due to the small changes in pressure at low operating temperatures. Furthermore, the devices 10 and 12 are preferably charged with a high pressure gas such as ethane. When the temperature responsive devices are employed and are charged with a high pressure gas, full advantage is taken of the response to temperature change in the system and adequate movement of the valve per degree of superheat change is provided. It is, therefore, not necessary to provide an oversized valve construction in order to obtain satisfactory operation at very low temperatures.

During the operation of the refrigerating system described above, the temperature feeler bulb 14 responds to the saturation temperature of the liquid refrigerant in the evaporator as determined by the presence of liquid refrigerant in the chamber 16 even if the valve 26 is closed, which assures operation of the control to admit liquid refrigerant to the evaporator whenever it is required to maintain the desired superheat. It will be evident that where the temperature responsive bulb 14 is arranged to be responsive to liquid refrigerant in the evaporator there might be occasions, particularly after the system has been out of operation for some time, when no liquid refrigerant will be present in the evaporator. The temperature of the evaporator would then be high and the valve 26 would be closed by the excess of pressure in the device 12, and on starting the refrigerating system, there would be no arrangement for reducing the temperature of the bulb 14; consequently, the valve would remain closed and render the system inoperative. It is for this reason that the by-pass, including the connection 17, the chamber 16 and the connection 18, is provided around the valve 7 to maintain liquid refrigerant in heat exchange with the feeler bulb 14. It will readily be apparent that liquid refrigerant will be admitted to the chamber 16 as soon as it is available on the high side of the system and the thermostatic expansion valve 7 will take over control as readily as does the conventional thermostatic expansion valve provided with the usual pressure responsive element.

The refrigerant passing through the chamber 16 represents a loss since this refrigerant is not employed in the evaporator for cooling. The loss may be reduced by providing thermal insulation about the chamber 16; for example, a metal casing 37 may be arranged about the chamber 16 and the space between the chamber and the casing filled with insulating material 38. The insulating material minimizes the absorption of heat from the ambient surrounding the control device and thereby minimizes the loss of effective refrigeration due to the by-pass connection.

Since the interior of the valve body 7 is filled with warm liquid refrigerant, condensation of the vapor in the expansible elements 10 and 12 cannot occur. This prevents loss of control by the devices 10 and 12 due to the condensation which might otherwise occur under certain conditions of operation. Furthermore, since the expansible bellows 21 and 22 are both subject to the pressure of the liquid refrigerant on the high side of the system the control is balanced against any changes in pressure occurring on the outside of the expansible chamber devices, and the only pressures which operate to move the yoke 25 are the pressures within the expansible chambers as determined by their respective feeler bulbs.

During the operation of the refrigerating system illustrated in Fig. 1, assuming the compressor to have stopped, there is a tendency for the pressures throughout the system to become equalized and refrigerant may or may not remain liquid in the evaporator 6. When the compressor 1 is started upon a demand for cooling, the hot compressed refrigerant is liquefied in the condenser 2 and collects in the receiver 4. Sufficient liquid refrigerant flows through the flow control valve 20 to maintain the level 19 in the chamber 16 and as the operation of the compressor continues, the suction pressure is lowered and the temperature of the refrigerant in the chamber 16 is also lowered until the feeler bulb 14 is cooled sufficiently to reduce the pressure within the device 12 and open the valve. It will be understood that the relatively high pressure in the device 10 assists in this opening at least during the initial stages before the temperature of the suction gas is lowered to cause the device 10 to assist the spring 30 in its closing action.

It is further possible to fill the two temperature responsive devices with different amounts of gas, as determined by the charging pressures, and so control the initial opening operation of the valve after starting the compressor. By filling the expansible chamber 12 to a higher charging pressure than that of the expansible chamber 10, this difference in pressure, in addition to the force exerted by spring 30 will hold the valve 26 in a tightly closed position during shutdown conditions, and the initial opening of the valve can be delayed until the gas in feeler bulb 14 is cooled to some predetermined temperature. Upon opening of the valve 26, liquid refrigerant flows into the several evaporator conduits through the distributor 8 and the vaporized refrigerant or suction gas is returned to compressor 1. The expansible chamber devices 10 and 12 cooperating with the spring 30 control the opening of the valve 26 to maintain the predetermined number of degrees of superheat in the vaporized refrigerant returned to the compressor. The superheat setting may be adjusted by removing the cap 32 and turning the shaft 33. The temperature of the bulb 14 is maintained, throughout operation of the refrigerating system, at the boiling point of the liquid refrigerant in the evaporator because the pressure in the chamber 16 is maintained at the pressure of the evaporator suction line.

The system of Fig. 3 is essentially similar to that of Fig. 1. Only those portions of the system necessary to understand the differences between the two systems have been shown and corresponding parts have been designated by the same numerals as employed in Fig. 1. In the sytem of Fig. 3, the feeler element 14 of the saturation temperature control device 12 is cooled by a by-pass around the valve 7 which comprises a connection 39, a capillary tube or restricted expansion device 40 and a larger tube 41 communicating with the lowermost conduit of the evaporator through a T-connection 42. The capillary tube 40 controls the flow of refrigerant to the tube 41 and the refrigerant flowing through the capillary tube cools a plurality of turns of the tube 41 which are wound about the feeler bulb 14 as indicated at 43. The refrigerant in the coil 43 is at the saturation temperature of the liquid refrigerant in the evaporator. The feeler element 14 and coil 43 may be insulated in the same manner as the chamber 16 of Fig. 1 to minimize the loss of refrigerating capacity due to the by-passing of the valve 7. In determining the amount of refrigerant to be allowed to flow through the by-pass in Fig. 3, the minimum required flow of the valve 7 should be taken into consideration because the by-pass should not require more refrigerant than the minimum requirement of the valve if the desired number of degrees of superheat are to be maintained.

The operation of the refrigerating system shown in Fig. 3 is essentially the same as that of the system of Fig. 1. The feeler bulb 14 of the control member 12 is cooled during the operation of the system by the evaporation of liquid refrigerant in the coil 43. This coil is a refrigerant evaporator supplied by the expansion device 40 so that the temperature within the coil 43 is maintained at the temperature corresponding to the evaporator pressure. Obviously, the connection 41 may be arranged in the same manner as the connection 18 of Fig. 1 if it is desired to eliminate the effect of pressure drop through the evaporator.

In some refrigerating systems it may be desirable to modify the operation of the thermostatic expansion valve in order to obtain a somewhat different superheat characteristic. The embodiment of my invention shown in Fig. 4 includes an arrangement for modifying the superheat characteristic of the control valve so that the required control of superheat may be obtained over a wider range of evaporator temperatures. The refrigerating system of Fig. 4 is similar to that of Fig. 1 and corresponding parts have been designated by the same numerals. Instead of employing a single stage compressor, this system is provided with a multi-stage compressor shown as comprising first and second stage cylinders 44 and 45, respectively, which may be the cylinders of separate compressors or two cylinders of the same compressor. The vaporized refrigerant withdrawn from the evaporator enters the cylinder 44 from the suction line and is compressed to the intermediate pressure and is discharged through an interstage connection 46 to the high pressure cylinder 45. The refrigerant is then cooled and liquefied in the condenser 2 and collects in the receiver 4 from which it is supplied to the evaporator 6 under control of a thermostatic expansion valve 47. The valve 47 is similar in construction to the valve 7 of Figs. 1 and 2 and is provided with temperature responsive actuating elements 10 and 12 responsive to the suction line and saturation temperatures, respectively. The refrigerant supplied by the valve 47 is distributed to the several parallel conduits of the evaporator 6 by the distributor 8 and the vaporized refrigerant is returned to the suction line 9 to complete the cycle. As shown in Fig. 5, the valve 47 differs from the valve 7 in that the surfaces of the bellows 21 and 22 which are outside the expansible chambers and within the valve casing are not maintained at the pressure and temperature of the warm liquid refrigerant, but are maintained at different pressures. In order to maintain the devices 10 and 12 at different pressures, plates 48 and 49 are arranged between the main body of the valve 47 and the devices 10 and 12, respectively. The bellows 21 is sealed from the interior of the valve body by a second bellows or expansible seal 50 which is sealed at one end and which communicates with the bellows 21 by means of a push rod head 51 and is sealed to the plate 48 about an opening 52 through which passes a push rod or valve stem 53 having a head 51 at its upper end. The bellows 21 is biased upwardly by a spring 54 arranged between the plate 48 and the push rod head 51. The yoke 25 is coupled directly to the bellows by the push rod 53 through the push rod head 51. The construction of the lower end of the valve is similar, the bellows 22 being sealed to provide a space between the bellows and the plate 49 by a bellows 55 and being biased by a spring 56, the two bellows being separated by a push rod head 57 which also serves as a seat for the spring 56 so that the spring is compressed between the bellows and the plate 49. Movement of the bellows 22 is transmitted directly to the yoke 25 and valve 26 through a push rod or stem 58 having the push rod head 57 at its lower end.

The space sealed between the bellows 21 and the bellows 50 is maintained at the pressure prevailing in the interstage connection 46. This is accomplished by arranging a tube 59 to provide communication between the interstage connection and a duct 60 in the plate 48. The pressure within the bellows 21 is thus compensated by the pressure between the two bellows. In a similar manner the space between the bellows 22 and the sealing bellows 55 is maintained at the pressure in the suction line 9 by connecting the suction line by a tube 61 to a duct 62 in the plate 49, the duct 62 opening into the space between the two bellows. The amount of superheat maintained by the valve 47 is thus dependent upon changes in the difference of pressure between the interstage and suction connections as well as upon the difference in temperature of the two feeler bulbs and it has been found that the characteristic obtained provides control with a constant degree of superheat over a wide range of evaporator temperatures. This insures sensitive and uniform control.

In Figs. 6 and 7 there is illustrated another embodiment of my invention which is similar to that of Figs. 4 and 5 in that the suction and interstage pressures are employed to modify the superheat characteristic. The system of Figs. 6 and 7 is arranged to be applied to evaporators which do not involve a drop in the pressure of the refrigerant between the valve and the evaporator such as is produced by the distributor 8 in the refrigerating systems described above. The compressors, condenser and receiver shown in Fig. 6 are similar to those of Fig. 4 and have been designated by the same numerals. The evaporator employed in this system is a single series tube evaporator 63 supplied with refrigerant from the liquid line 5 through operation of a thermostatic expansion valve 64 having an outlet conduit 63' leading to the evaporator 63. The valve 64 is actuated in accordance with the suction line and saturation temperatures of the refrigerant in the same manner as the valves of the systems described above; however, the construction has been modified so that the arrangement for priming or cooling the saturation temperature responsive element may be included within the valve body as clearly shown in Fig. 7. The valve 64 comprises a valve body to which are secured expansible chamber actuating devices 65 and 66 at the top and bottom, respectively. These devices are provided with expansible chambers formed by diaphragms 67 and 68, respectively. The diaphragms are connected in opposed relation through rods 69 and 70 secured to the diaphragms 67 and 68, respectively, and engaging a valve 71. The valve 71 is provided for controlling a valve passage 72 between the valve inlet indicated at 73 and the outlet 74. The expansible chamber member 65 includes a tube 75 connecting the chamber formed by the diaphragm 67 with a feeler bulb 76 located on the suction line 9 and responsive to the temperature of the vaporized refrigerant withdrawn from the evaporator. The under side of the diaphragm 67 is maintained at the pressure of the interstage connection 46 by its communication with the interstage connection through a tube 77 and a tube 78 in the valve body. Condensation of the vapor charge of the expansible chamber in the space above the diaphragm 67 is prevented since the wall 79 is maintained in contact with the warm liquid refrigerant flowing from the inlet 73 toward the valve 71, a duct 80 being provided to connect the inlet passage and valve opening 72. By virtue of this arrangement the entire upper portion of the valve, above the wall 79, is maintained at a relatively warm temperature which is above the condensation point of the vapor charge in the expansible chamber.

The diaphragm 68 of the device 66 is maintained at the saturation temperature of the liquid refrigerant in the evaporator. This is accomplished by admitting liquid refrigerant from the inlet 73 through a duct 81 to the chamber 82 in the valve body. The chamber 82 communicates with the space above the diaphragm 68 through ducts 83 and 84. The chamber 82 is maintained at the pressure of the refrigerant in the evaporator through an orifice 85 connecting the chamber with the outlet 74 of the valve, the outlet 74 being as the pressure within the evaporator 63. The space above the diaphragm 68 is also maintained at evaporator pressure through a duct 86 and an orifice 87 in a sliding valve adjusting member 88. Liquid refrigerant is maintained in the chamber 82 at all times by operation of the float 89 which controls a valve 90 and, since the liquid refrigerant is maintained at evaporator pressure, the temperature of the diaphragm 68 which is covered with the liquid is the saturation temperature of the liquid refrigerant at that pressure. The device 66 is provided with a tube 91 similar to the tube 75 of the device 65. This tube 91, however, is sealed off at 92 since no feeler element is required to operate the control member.

Both the expansible chamber devices 65 and 66 are preferably charged with a high pressure gas such as ethane as are the bellows in the other systems described above.

The superheat setting of the valve 64 may be adjusted by removing a plug 93 and turning a nut 94 threaded on a stud 95. This adjustment changes the pressure exerted on the valve 71 by a spring 96; the spring 96 is arranged between the nut 94 and the member 88 which engages the valve 71 and is arranged to slide in a cylindrical chamber 97. The spring 96 determines the amount of superheat maintained by the valve in the same manner as does the spring 30 in Fig. 2.

Because the upper side of the diaphragm 68 is maintained at the evaporator pressure the superheat control is modified in accordance with the difference between the evaporator pressure and interstage pressure which exists below the diaphragm 67. This provides essentially the same modification of the superheat control as is obtained in the arrangement of Fig. 5. It should be noted, however, that because of the pressure drop through the evaporator, the pressure above the diaphragm 68 is not exactly the same as the suction pressure and, of course, the saturation temperature determined by the device 66 may be somewhat higher than the saturation temperature at the suction line. It is therefore, desirable to employ the valve 64 with evaporators having relatively little pressure drop between their inlets and outlets.

All of the refrigerating systems and control valves described above are particularly suited to maintaining very low temperatures in refrigerating systems of the compression type. The disadvantages of the conventional thermostatic valve when applied to this type of system have been eliminated without requiring a complicated or less rugged construction.

While I have illustrated specific applications of my invention in connection with compression type refrigerating systems, other applications will readily be apparent to those skilled in the art. I do not, therefore, desire my invention to be limited to the particular arrangements described and illustrated and I intend by the appended claims to cover all modifications within the spirit and scope of my invention.

What I claim as new and desire to secure by Letters Patent of the United States is:

1. In a refrigerating system comprising a condenser and an evaporator and means for withdrawing vaporized refrigerant from said evaporator and returning it to said condenser, an expansion valve for controlling the flow of refrigerant from said condenser to said evaporator, and control means for actuating said valve to maintain a predetermined amount of superheat in the vaporized refrigerant withdrawn from said evaporator, said control means comprising two expansible chamber devices including temperature responsive feeler elements and arranged in opposed relation to actuate said valve, both said devices being charged with a gas having a high pressure relative to the pressure of the refrigerant at the operating temperatures of said system, the feeler element of one of said devices being positioned to be responsive to the saturation temperature of the liquid refrigerant in said evaporator and that of the other of said devices to be responsive to the temperature of the vaporized refrigerant withdrawn from said evaporator, said one device tending to close said valve on an increase in temperature and the other device to open said valve on an increase in temperature.

2. In a refrigerating system comprising a condenser and an evaporator, an expansion valve for controlling the flow of refrigerant from said condenser to said evaporator, means including a temperature responsive device for actuating said valve, said device tending to open said valve upon a fall in temperature, and means arranged to by-pass said valve and supply liquid refrigerant from said condenser for maintaining a body of liquid refrigerant in contact with a portion of said device and for maintaining said body of liquid at substantially the pressure within said evaporator whereby said device is actuated in accordance with the temperature corresponding substantially to the pressure of the refrigerant within said evaporator.

3. In a refrigerating system comprising a condenser and an evaporator and means for withdrawing vaporized refrigerant from said evaporator and returning it to said condenser, an expansion valve for controlling the flow of refrigerant from said condenser to said evaporator, control means for actuating said valve to maintain a predetermined amount of superheat in the vaporized refrigerant withdrawn from said evaporator, said control means comprising two temperature responsive devices arranged in opposed relation to actuate said valve, one of said devices tending to open said valve on an increase in temperature and the other of said devices tending to close said valve on an increase in temperature, said one device being arranged to be responsive to the temperature of the vaporized refrigerant withdrawn from said evaporator, and means independent of said valve for maintaining liquid refrigerant in heat exchange relation with said other device and substantially at the pressure within said evaporator whereby said other device is responsive to substantially the saturation temperature of the refrigerant in said evaporator.

4. In a refrigerating system comprising a refrigerant condenser and a refrigerant evaporator, an expansion valve for controlling the flow of refrigerant from said condenser to said evaporator, means including a temperature responsive device for actuating said valve, said device tending to open said valve upon a fall in temperature, means providing a chamber and arranged to by-pass said valve for maintaining a body of liquid refrigerant in contact with said device, a float operated means for controlling said by-pass to maintain said body of liquid at a predetermined level within said chamber, said by-pass means being arranged to maintain said chamber at substantially the pressure of the refrigerant within said evaporator whereby said device is actuated in response to substantially the saturation temperature of the refrigerant within the evaporator.

5. In a refrigerating system comprising a refrigerant condenser and a refrigerant evaporator and means for withdrawing vaporized refrigerant from said evaporator and returning it to said condenser, an expansion valve for controlling the flow of refrigerant from said condenser to said evaporator, control means for actuating said valve to maintain a predetermined amount of superheat in the vaporized refrigerant withdrawn from said evaporator, said control means comprising two temperature responsive devices arranged in opposed relation to actuate said valve, one of said devices tending to open said valve on an increase in temperature and the other of said devices tending to close said valve on an increase in temperature, said one device being arranged to be responsive to the temperature of the vaporized referigerant withdrawn from said evaporator, means providing a by-pass around said valve and including a chamber for holding a body of liquid refrigerant in heat exchange relation with a portion of said other device, said by-pass means being arranged to maintain said chamber at substantially the pressure within said evaporator whereby said other device is responsive to substantially the saturation temperature of the refrigerant in the evaporator, and means including a float arranged in said chamber for maintaining the liquid refrigerant in said chamber at a predetermined level.

6. An expansion valve for refrigerating systems comprising a valve body having a valve therein, control means comprising two temperature responsive devices arranged in opposed relation for actuating said valve, a chamber in said valve body and passages connecting said chamber between the inlet and outlet of said valve for by-passing said valve, and means including a float for maintaining a predetermined level of liquid refrigerant in said chamber, said chamber and one of said devices being so constructed and arranged that liquid refrigerant in said chamber is maintained in contact with a portion of said one device and at the pressure of the refrigerant in the outlet of said valve whereby said device is responsive to the saturation temperature of the referigerant in said chamber.

7. In a refrigerating system comprising a refrigerant condenser and a refrigerant evaporator, an expansion valve for controlling the flow of refrigerant from said condenser to said evaporator, means including a temperature responsive device for actuating said valve, said device tending to open said valve upon a fall in temperature, means providing a chamber and arranged to by-pass said valve for maintaining a body of liquid refrigerant in contact with said device, insulating means surrounding said chamber for minimizing the flow of heat to said chamber, a float operated means for controlling said by-pass to maintain said body of liquid at a predetermined level within said chamber, said by-pass means being arranged to maintain said chamber at substantially the pressure of the refrigerant within said evaporator whereby said device is actuated in response to substantially the saturation temperature of the refrigerant within the evaporator.

8. In a refrigerating system comprising a condenser and an evaporator and means for withdrawing vaporized refrigerant from said evaporator and returning it to said condenser, said evaporator comprising a plurality of parallel refrigerant circuits, an expansion valve for controlling the flow of refrigerant from said condenser to said evaporator, a refrigerant distributor connected between said valve and said evaporator for apportioning the refrigerant among said circuits, control means for actuating said valve to maintain a predetermined amount of superheat in the vaporized refrigerant withdrawn from said evaporator, said control means comprising two temperature responsive devices arranged in opposed relation to actuate said valve, one of said devices tending to open said valve on an increase in temperature and the other of said devices tending to close said valve on an increase in temperature, said one device being arranged to be responsive to the temperature of the vaporized refrigerant withdrawn from said evaporator, and means including a by-pass around said valve and said distributor for maintaining liquid refrigerant in heat exchange relation with a portion of said other device and at the pressure within said evaporator whereby said other device is responsive to the saturation temperature of the refrigerant in said evaporator.

9. In a refrigerating system comprising a condenser, an evaporator and means for withdrawing vaporized refrigerant from said evaporator and returning it to said condenser, a valve body having an expansion valve arranged therein for controlling the flow of refrigerant from said condenser to said evaporator, control means for actuating said valve to maintain a predetermined amount of superheat in the vaporized refrigerant withdrawn from said evaporator, said control means comprising two fluid charged expansible chamber devices within said valve body and arranged in opposed relation to actuate said valve, temperature responsive feeler elements for said devices, the feeler element of one of said devices being responsive to the saturation temperature of the liquid refrigerant in the evaporator and that of the other of said devices being responsive to the temperature of the vaporized refrigerant withdrawn from the evaporator, each of said expansible chamber devices being subject on their exterior to the pressure of the condensed refrigerant entering said valve and being arranged in heat exchange with the condensed refrigerant whereby the effects of external pressure on said devices are balanced and condensation of the expansible fluid within said devices is prevented.

10. An expansion valve for refrigerating systems comprising a valve body having a valve therein, control means comprising two temperature responsive devices arranged in opposed relation for actuating said valve, a chamber in said valve body and passages connecting said chamber between the inlet and the outlet of said valve for by-passing said valve, and means including a float for maintaining a predetermined level of liquid refrigerant in said chamber, one of said temperature responsive devices comprising an expansible chamber charged with a gas having a relatively high pressure as compared with the pressure of the refrigerant at the operating temperatures of the system and having an outer wall of said expansible chamber in contact with the liquid refrigerant in said float chamber, said float chamber being arranged to be maintained in communication with the outlet of said valve whereby refrigerant in said chamber is maintained at the saturation temperature corresponding to the pressure in the outlet of said valve and said one device is responsive to said saturation temperature.

11. In a low temperature refrigerating system, comprising a condenser, an evaporator and a multi-stage compressor for withdrawing vaporized refrigerant from said evaporator and returning it to said condenser, an expansion valve for controlling the flow of refrigerant from said condenser to said evaporator and control means for actuating said valve to maintain a predetermined amount of superheat in the vaporized refrigerant withdrawn from said evaporator, said control means comprising two fluid charged expansible chamber devices including temperature responsive feeler elements and arranged in opposed relation to actuate said valve, the feeler element of one of said devices being positioned to be responsive to the saturation temperature of the liquid refrigerant in said evaporator and that of the other of said devices being responsive to the temperature of the vaporized refrigerant withdrawn from said evaporator, said one device tending to close said valve on an increase in temperature and said other device tending to open said valve on an increase in temperature, means for maintaining the exterior of the expansible chamber of said one device at the pressure in said evaporator, and means for maintaining the exterior of the expansible chamber of said other device at the pressure of the refrigerant passing from one stage of said compressor to another stage thereof whereby the amount of superheat maintained by said control means is adjusted in accordance with both the differential in temperature between said temperature responsive feeler elements and the differential in pressure between the pressure at a point intermediate one low stage and one high stage compressor and the pressure of vapor in the evaporator.

12. In a refrigerating system comprising a condenser and an evaporator and means for withdrawing vaporized refrigerant from said evaporator and returning it to said condenser, an expansion valve for controlling the flow of refrigerant from said condenser to said evaporator, and control means for actuating said valve to maintain a predetermined amount of superheat in the vaporized refrigerant withdrawn from said evaporator, said control means comprising two expansible chamber devices including temperature responsive feeler elements and arranged in opposed relation to actuate said valve, both said devices being charged with a gas having a relatively high pressure at the operating temperatures of said system, the feeler element of one of said devices being positioned to be responsive to the saturation temperature of the liquid refrigerant in said evaporator and that of the other of said devices to be responsive to the temperature of the vaporized refrigerant withdrawn from said evaporator, said one of said devices being charged with said gas to a higher pressure than said other of said devices and tending to hold the valve in a closed position during shut-down conditions.

13. In a refrigerating system comprising a condenser and an evaporator and means for withdrawing vaporized refrigerant from said evaporator and returning it to said condenser, an expansion valve for controlling the flow of refrigerant from said condenser to said evaporator, and control means for actuating said valve to maintain a predetermined amount of superheat in the vaporized refrigerant withdrawn from said evaporator, said control means comprising two expansible chamber devices including temperature responsive feeler elements and arranged in opposed relation to actuate said valve, the feeler element of one of said devices being positioned to be responsive to the saturation temperature of the liquid refrigerant in said evaporator and that of the other of said devices to be responsive to the temperature of the vaporized refrigerant withdrawn from said evaporator, one of said devices being charged with a gas having a higher vapor pressure than the gas in said other of said devices for modifying the superheat characteristics of said control means.

14. An expansion device for controlling the flow of refrigerant in a refrigerating system or the like comprising a valve body having an inlet and an outlet, a valve between said inlet and said outlet, two temperature responsive devices arranged in opposed relation to actuate said valve, one of said devices tending to open said valve on an increase in temperature and the other of said devices tending to close said valve on an increase in temperature, and means independent of said valve for maintaining liquid refrigerant in heat exchange relation with said other device and at substantially the pressure within said outlet whereby said other device is responsive to substantially the saturation temperature of the refrigerant at said outlet pressure.

15. An expansion device for controlling the flow of refrigerant in a refrigerating system or the like comprising a valve body having an inlet and an outlet, a valve between said inlet and said outlet, two temperature responsive devices arranged in opposed relation to actuate said valve, one of said devices tending to open said valve on an increase in temperature and the other of said devices tending to close said valve on an increase in temperature, means providing a by-pass around said valve and including a chamber for holding a body of refrigerant in heat exchange relation with a portion of said other device, said by-pass means being arranged to maintain said chamber at substantially the pressure in said outlet whereby said other device is responsive to substantially the saturation temperature of the refrigerant at said pressure, and means including a float in said chamber for maintaining the liquid refrigerant in said chamber at a predetermined level.

HAROLD F. LATHROP.

REFERENCES CITED

The following references are of record in the file of this patent:

UNITED STATES PATENTS

| Number | Name | Date |
|---|---|---|
| 971,788 | Pollard | Oct. 4, 1910 |
| 990,772 | Pollard | Apr. 25, 1911 |
| 1,988,776 | Berghoefer | Jan. 22, 1935 |
| 2,165,519 | Stolz | July 11, 1939 |
| 2,242,334 | Wile | May 20, 1941 |
| 2,319,993 | Kaufman | May 25, 1943 |
| 2,320,055 | Stickel | May 25, 1943 |
| 2,363,010 | Matteson | Nov. 21, 1944 |